(12) United States Patent
Chu

(10) Patent No.: US 10,707,660 B2
(45) Date of Patent: Jul. 7, 2020

(54) RECEIVING DEVICE AND CABLE HARNESS

(71) Applicant: Schlemmer GmbH, Poing (DE)

(72) Inventor: Van Ngoc Chu, Poing (DE)

( * ) Notice: Subject to any disclaimer, the term of this patent is extended or adjusted under 35 U.S.C. 154(b) by 0 days.

(21) Appl. No.: 16/301,599

(22) PCT Filed: Mar. 21, 2017

(86) PCT No.: PCT/EP2017/056678
§ 371 (c)(1),
(2) Date: Nov. 14, 2018

(87) PCT Pub. No.: WO2017/198365
PCT Pub. Date: Nov. 23, 2017

(65) Prior Publication Data
US 2019/0319437 A1    Oct. 17, 2019

(30) Foreign Application Priority Data

May 17, 2016 (DE) ........................ 10 2016 109 048

(51) Int. Cl.
*H02G 3/06* (2006.01)
*F16L 33/035* (2006.01)
(Continued)

(52) U.S. Cl.
CPC ................ *H02G 3/06* (2013.01); *F16L 3/085* (2013.01); *F16L 33/035* (2013.01); *H01B 7/0045* (2013.01); *B60R 16/0215* (2013.01)

(58) Field of Classification Search
CPC .......... H02G 3/06; F16L 3/085; F16L 33/035; H01B 7/0045; B60R 16/0215
(Continued)

(56) References Cited

U.S. PATENT DOCUMENTS

| 3,711,632 | A | * | 1/1973 | Ghirardi | .................. | H02G 3/06 |
| | | | | | | 174/135 |
| 3,711,633 | A | * | 1/1973 | Ghirardi | .................. | H02G 3/06 |
| | | | | | | 174/135 |

(Continued)

FOREIGN PATENT DOCUMENTS

| CN | 105206987 A | 12/2015 |
| DE | 102008022492 A1 | 12/2008 |

(Continued)

OTHER PUBLICATIONS

Korean Intellectual Property Office, Office Action Issued in Application No. 10-2018-7034397, dated Nov. 11, 2019, Korea, 14 Pages.

(Continued)

*Primary Examiner* — Timothy J Thompson
*Assistant Examiner* — Michael F McAllister
(74) *Attorney, Agent, or Firm* — Alleman Hall Creasman & Tuttle LLP

(57) ABSTRACT

A receiving device, in particular a distributor, for receiving a tube for electric cables, comprises a main part with at least one receiving section in which an end portion of the tube can be received. The main part has first and second half-shells, between which the end portion is arranged. The receiving device also comprises multiple spring-elastically deformable engagement sections which protrude radially into the receiving section and which are designed to engage into the tube in a formfitting manner, wherein first and second proportions of the engagement sections are respectively provided on the half-shells; and an annular section which encircles the receiving section and on which the engagement sections are provided. The annular section is divided into first and second annular segments which are respectively paired with the half-shells. The first annular segment pro- (Continued)

trudes into the second half-shell in a closed state of the receiving device.

14 Claims, 17 Drawing Sheets

(51) Int. Cl.
*F16L 3/08* (2006.01)
*H01B 7/00* (2006.01)
*B60R 16/02* (2006.01)

(58) Field of Classification Search
USPC .......................................................... 174/71 R
See application file for complete search history.

(56) References Cited

U.S. PATENT DOCUMENTS

| | | | | | |
|---|---|---|---|---|---|
| 4,538,869 | A | * | 9/1985 | Richards | .................. H01R 4/70 439/596 |
| 4,797,512 | A | * | 1/1989 | Kumagai | ............... H02G 15/18 174/135 |
| 5,046,766 | A | * | 9/1991 | Lomberty | ........... F16L 25/0036 285/419 |
| 6,085,795 | A | * | 7/2000 | Ogawa | ................ B60R 16/0222 138/108 |
| 7,581,564 | B2 | * | 9/2009 | Tanaka | .................... F16L 21/06 138/110 |
| 7,709,736 | B2 | * | 5/2010 | Irisawa | ............... B60R 16/0215 174/135 |
| 2004/0154817 | A1 | * | 8/2004 | Sudo | .................... H02G 3/0468 174/481 |
| 2008/0277015 | A1 | * | 11/2008 | Tanaka | ................ F16L 25/0045 138/110 |
| 2010/0164226 | A1 | * | 7/2010 | Serizawa | ............... F16L 3/1091 285/149.1 |

FOREIGN PATENT DOCUMENTS

| | | |
|---|---|---|
| DE | 102013220564 A1 | 4/2015 |
| EP | 0402281 A1 | 12/1990 |
| EP | 0818855 A1 | 1/1998 |
| FR | 2828723 B1 | 10/2007 |
| JP | 2002199547 A | 7/2002 |

OTHER PUBLICATIONS

European Patent Office, Office Action Issued in Application No. 17712481.5, dated Nov. 18, 2019, Netherlands, 8 pages.
China National Intellectual Property Administration, Office Action and Search Report Issued in Application No. 201780030271.3, dated Oct. 9, 2019, 12 pages.

* cited by examiner

RECEIVING DEVICE AND CABLE HARNESS

The present invention relates to a receiving device, in particular a distributor, for receiving a tube for electric cables, and to a cable harness having a receiving device of this type.

Corrugated tubes can be used for routing cables, tubes, or pipes. A cable harness can have a multiplicity of cables which are routed by way of various corrugated tubes having dissimilar diameters. The cable harness can furthermore have a distributor into which, for example, a first corrugated tube having a large diameter leads and from which two corrugated tubes having, for example, smaller diameters lead off. The cables that are received in the first corrugated tube can be distributed among the two other corrugated tubes. The distribution of the cables is performed within the distributor to which the corrugated tubes are fixed. It is possible herein for distributors which have a plurality of outputs having dissimilar or identical diameters to be used. The corrugated tubes can be fixed to said outputs.

Against this background, an object of the present invention lies in making available an improved receiving device.

Accordingly, a receiving device, in particular a distributor, for receiving a tube for electrical cables is proposed. The receiving device comprises a main body having at least one receptacle portion in which an end portion of the tube at least in portions is receivable, wherein the main body has a first half shell and a second half shell between which the end portion of the tube is disposable. The receiving device furthermore comprises a plurality of engagement portions which are deformable in a spring-elastic manner and which protrude radially into the at least one receptacle portion and which are specified for engaging in a form-fitting manner in the tube, wherein a first part of the engagement portions is provided on the first half shell, and a second part of the engagement portions is provided on the second half shell.

The receiving device furthermore has an annular portion which encircles the at least one receptacle portion and on which the engagement portions are provided, wherein the annular portion is subdivided into a first annular segment that is assigned to the first half shell and into a second annular segment that is assigned to the second half shell, and wherein the first annular segment in a closed state of the receiving device protrudes into the second half shell.

The tube can be, for example, a corrugated tube, a smooth tube, in particular a polyvinyl chloride tube (PVC tube), or a textile tube or woven-fabric tube. The tube can therefore also be referred to as a smooth tube, textile tube, woven-fabric tube, or corrugated tube. In the case of the tube being a smooth tube or a textile tube or woven-fabric tube, the engagement portions engage in a form-fitting manner in the tube in that the tube is deformed, in particular reversibly deformed, by the engagement portions. In the case of a textile tube or woven-fabric tube, the engagement portions engage in the woven fabric and can interlock with the latter. In the case of a smooth tube, the engagement portions engage in the preferably elastically deformable material of the smooth tube. The engagement portions can in particular also cut into the material.

In the case of the tube being a corrugated tube, the engagement portions engage in a form-fitting manner in a wave trough of the tube. The receiving device in this instance comprises in particular a main body having at least one receptacle portion in which an end portion of the tube, in particular of the corrugated tube, at least in portions is receivable, wherein the main body has a first half shell and the second half shell between which the end portion of the tube, in particular of the corrugated tube, is disposable. The receiving device furthermore preferably comprises a plurality of engagement portions which are deformable in a spring-elastic manner and which protrude radially into the at least one receptacle portion and which are specified for engaging in a form-fitting manner in the wave trough of the tube, in particular of the corrugated tube, wherein the first part of the engagement portions is provided on the first half shell, and the second part of the engagement portions is provided on the second half shell.

The engagement portions are in particular specified for engaging in a form-fitting and radial manner in the tube. The receiving device preferably has a plurality of receptacle portions. The receiving device can also be referred to as a distributor, a distributing device, a universal distributor, an adapter, an adapter device, or a universal adapter. The receiving device is in particular suitable for receiving a tube of a cable harness. The receiving device can be T-shaped and therefore also be referred to as a T-distributor. When the tube is a corrugated tube, all engagement portions in this instance preferably engage in the common wave trough of the tube. The engagement portions are in particular specified for engaging in a form-fitting manner between two neighboring wave crests of the tube. The engagement portions can also be referred to as snap-fit hooks. The distributing device is preferably a plastic injection-molded part. The distributing device can be made from polyamide (PA), for example. The at least one receptacle portion preferably has a circular cross-sectional geometry, wherein the end portion of the tube at least in portions is disposed within the receptacle portion. The receiving device is capable of being transformed from a closed state in which the first half shell is disposed on the second half shell to an opened state in which the first half shell is not disposed on the second half shell and is in particular disposed beside the latter. "Radial" is to be understood as a direction toward a central axis of the at least one receptacle portion. The radial direction is in particular oriented so as to be perpendicular to the central axis.

The receiving device is suitable for mobile applications such as motor vehicles, marine craft, aircraft, and rail vehicles. The receiving device can also be used in non-mobile applications such as apparatuses, buildings, machine tools, process-technology systems, or the like. A form-fitting connection is created by the mutual engagement of at least two connecting partners, or the engagement of the latter behind one another, the connecting partners in this case being the engagement portions and the wave trough of the tube that is configured as a corrugated tube. The engagement portions protruding radially into the at least one receptacle portion is to be understood such that the engagement portions protrude in the direction toward the central axis of the at least one receptacle portion.

On account of the engagement portions being deformable in a spring-elastic manner, a multiplicity of dissimilar tubes, in particular corrugated tubes having dissimilar diameters, can be selectively received in the at least one receptacle portion. In this respect, an enormous saving in costs is possible as compared to known distributors in which a dedicated distributor is provided for each tube diameter or for each combination of tube diameters, respectively, since the similar distributors do not have to be kept on hand. On account of the first annular segment in the closed state of the receiving device protruding into the second half shell, a preliminary fixing of the tube can be achieved by way of the engagement portions that are assigned to the first annular segment. This means that the tube cannot fall out of the receiving device even in the opened state of the latter.

According to one further embodiment the tube is a corrugated tube, wherein the engagement portions are specified for engaging in a form-fitting manner into a wave trough of the tube.

The corrugated tube can also be referred to as a corrugated pipe or be a corrugated pipe. A corrugated tube has a corrugation having alternating wave crests and wave troughs. A wave trough herein is disposed between two wave crests, and a wave crest is disposed between two wave troughs.

According to one further embodiment at least three engagement portions are provided, and/or the first part of the engagement portions comprises at least two engagement portions and the second part of the engagement portions comprises at least one engagement portion.

Four engagement portions are preferably provided. However, more than four engagement portions, for example five or six engagement portions, can also be provided. The number of engagement portions is arbitrary. The first part of the engagement portions preferably comprises three engagement portions, and the second part of the engagement portions preferably comprises exactly one engagement portion. Furthermore, the first part of the engagement portions can also comprise four engagement portions, and the second part of the engagement portions can comprise two engagement portions.

According to one further embodiment the engagement portions are disposed so as to be distributed in a non-uniform or uniform manner across a circumference of the at least one receptacle portion.

On account of the engagement portions being disposed so as to be distributed in a non-uniform manner across the circumference of the at least one receptacle portion it can be achieved that the first part of the engagement portions already fixes the end portion of the tube in a preliminary manner in the opened state of the receiving device such that the tube cannot fall out of the receiving device even in the opened state of the latter. The assembly of the cable harness is simplified on account thereof.

According to one further embodiment, each engagement portion has a spring element which is disposed so as to be oblique to a central axis of the at least one receptacle portion.

The spring element is preferably disposed at a predetermined angle to the central axis. The predetermined angle can be, for example, 35°. The spring element is in particular wedge-shaped or trapezoidal and, proceeding from an annular portion of the at least one receptacle portion, tapers off toward the central axis. Tapering off is presently to be understood to mean that a cross section of the spring element decreases in size in the direction of the central axis.

According to one further embodiment each engagement portion has a single hook element which is provided on the spring element and which is specified for engaging in a form-fitting manner in the tube.

In particular, each engagement portion has a hook element which is provided on the spring element and which is specified for engaging in a form-fitting manner in the wave trough of the tube, in particular of the corrugated tube. The spring element and the hook element form a snap-fit hook. This means that the engagement portions can also be referred to as snap-fit hooks, or are snap-fit hooks, respectively. The spring element and the hook element are preferably interconnected in a materially integral manner. This means that said spring element and said hook element form one component. In the spring-elastic deformation of the engagement portions the hook elements move radially outward in the direction of the annular portion. On account of only a single hook element and not, for example, two hook elements disposed beside one another, being provided, the receiving device can be used for the most varied types of corrugated tubes. On account thereof, the receiving device can be used for various corrugated tubes, for example, in which the wave troughs are mutually spaced apart in a variable manner. The hook element herein always engages in only one wave trough.

According to one further embodiment the first part of the engagement portion that is provided on the first half shell in an opened state of the receiving device is specified for holding in a self-reliant manner the end portion of the tube such that the end portion in the opened state of the receiving device is fixed to the at least one receptacle portion.

On account thereof, the preliminary fixing of the tube as already described above can be achieved. By transforming the receiving device from the opened state to a closed state, the receptacle portions which are provided on the second half shell now also engage in a form-fitting manner in the tube and in particular in the wave trough, on account of which the end portion is locked to the receiving device. An extraction of the tube from the receiving device in the closed state of the latter can only be achieved by destroying the receiving device and/or the tube. A secure retention of the tube in the receiving device is guaranteed on account thereof.

According to one further embodiment the annular portion completely encircles the at least one receptacle portion.

The annular portion extends radially in the direction of the central axis of the at least one receptacle portion.

According to one further embodiment the annular segments have dissimilar circumferential angles.

For example, the first annular segment can have a circumferential angle of 270°, and the second annular segment can have a circumferential angle of 90°.

According to one further embodiment the second annular segment in the closed state of the receiving device engages in the first annular segment.

The second annular segment engages in particular in a form-fitting manner in the first annular segment.

According to one further embodiment the first part of the engagement portions is provided on the first annular segment, and the second part of the engagement portions is provided on the second annular segment.

At least two of the engagement portions are preferably positioned on the first annular segment such that said engagement portions in the closed state of the receiving device are completely disposed within the second half shell.

According to one further embodiment, the receiving device furthermore comprises a plurality of receptacle portions, wherein each receptacle portion is assigned a plurality of engagement portions which are deformable in a spring-elastic manner and which protrude radially into the respective receptacle portion and which are specified for engaging in a form-fitting manner in a tube that is assigned to the respective receptacle portion.

The receiving device furthermore comprises in particular a plurality of receptacle portions, wherein each receptacle portion is assigned a plurality of engagement portions which are deformable in a spring-elastic manner and which protrude radially into the respective receptacle portion and which are specified for engaging in a form-fitting manner in a wave trough of a tube, in particular a corrugated tube, that is assigned to the respective receptacle portion. Each receptacle portion can preferably be assigned one tube. The tubes herein preferably have dissimilar diameters. The receiving device is furthermore preferably specified for receiving tubes of different types, for example a corrugated tube, a smooth tube, and a textile tube simultaneously. The receptacle portions in terms of construction can be configured so as to be identical or dissimilar, for example having dissimilar diameters. At least two receptacle portions are preferably provided. However, the number of receptacle portions is arbitrary. Three, four, five or more receptacle portions can also be provided. Depending on the arrangement of the receptacle portions, the receiving device can be configured as a so-called T-distributor, A-distributor, M-distributor, V-distributor, or Y-distributor.

According to one preferred embodiment the receiving device comprises a main body having a first receptacle portion in which an end portion of a first tube, in particular of a first corrugated tube, at least in portions is receivable; a second receptacle portion in which an end portion of a second tube, in particular of a second corrugated tube, at least in portions is receivable; and a third receptacle portion in which an end portion of a third tube, in particular of a third corrugated tube, at least in portions is receivable, wherein the main body has a first half shell and a second half shell between which the respective end portion of the tubes, in particular of the corrugated tubes, is disposable. The receiving device furthermore preferably comprises a plurality of engagement portions which are deformable in a spring-elastic manner and which protrude radially into the respective receptacle portion and which are specified for engaging in a form-fitting manner in a wave trough of the tube, in particular the corrugated tube, that is assigned to the respective receptacle portion, wherein a first part of the engagement portions is provided on the first half shell, and a second part of the engagement portions is provided on the second half shell. The receptacle portions are preferably tubular.

According to one further embodiment, central axes of the receptacle portions are positioned so as to be mutually parallel, mutually perpendicular, or at a predetermined mutual angle.

A central axis of the first receptacle portion and a central axis of the third receptacle portion are preferably disposed so as to be mutually parallel and in particular mutually coaxial, and a central axis of a second receptacle portion is positioned so as to be perpendicular or at the predetermined angle to the central axis of the first receptacle portion and/or to the central axis of the third receptacle portion. In the case of three receptacle portions, the receiving device in this instance is preferably configured as a T-distributor, V-distributor, or Y-distributor.

According to one further embodiment the first half shell and the second half shell are pivotably interconnected with the aid of a hinge, in particular of an integral hinge.

In particular, the first half shell, the second half shell, and the hinge are configured in a materially integral manner. This means that the first half shell, the second half shell, and the hinge can be made from the same material. Alternatively, the first half shell, the second half shell, and the hinge can also be made from dissimilar materials. For example, the hinge can be made from another, in particular a more flexible, material than the half shells or at least than one of the half shells. To this end, the receiving device can be produced, for example, with the aid of a bi-component injection-molding method. An integral hinge is a thin-walled connection between two pivotably interconnected components, in this case the half shells. The receiving device can be transformed from the opened state to the closed state and vice versa with the aid of the hinge. The receiving device furthermore preferably has snap-fit hooks that are provided on one of the half shells, for example on the first half shell, and has receptacle portions which correspond to the snap-hooks and which are provided on the other half shell, for example the second half shell. The receiving device can be locked in the closed state with the aid of the snap-fit hooks and the receptacle portions. The receiving device can be opened again by way of a spring-elastic deformation of the snap-fit hooks and/or of the receptacle portions.

A cable harness having a tube and a receiving device of this type is furthermore proposed.

The cable harness preferably has a plurality of tubes, in particular corrugated tubes, smooth tubes, woven-fabric tubes, and/or textile tubes, in which electric lines or cables can be received, for example. The cable harness can comprise a plurality of receiving devices.

Further potential implementations of the invention also comprise combinations of the features or embodiments mentioned previously or hereunder in the context of the exemplary embodiments that are/have not been explicitly mentioned. A person skilled in the art herein will also add individual aspects as improvements or additions to the respective basic form of the invention.

Further advantageous design embodiments and aspects of the invention are the subject matter of the dependent claims and of the exemplary embodiments of the invention described hereunder. The invention will furthermore be explained in more detail by means of preferred embodiments with reference to the appended figures in which:

In as far as not otherwise stated, identical elements or elements with equivalent functions are provided with the same reference sign in the figures.

Figure 1:
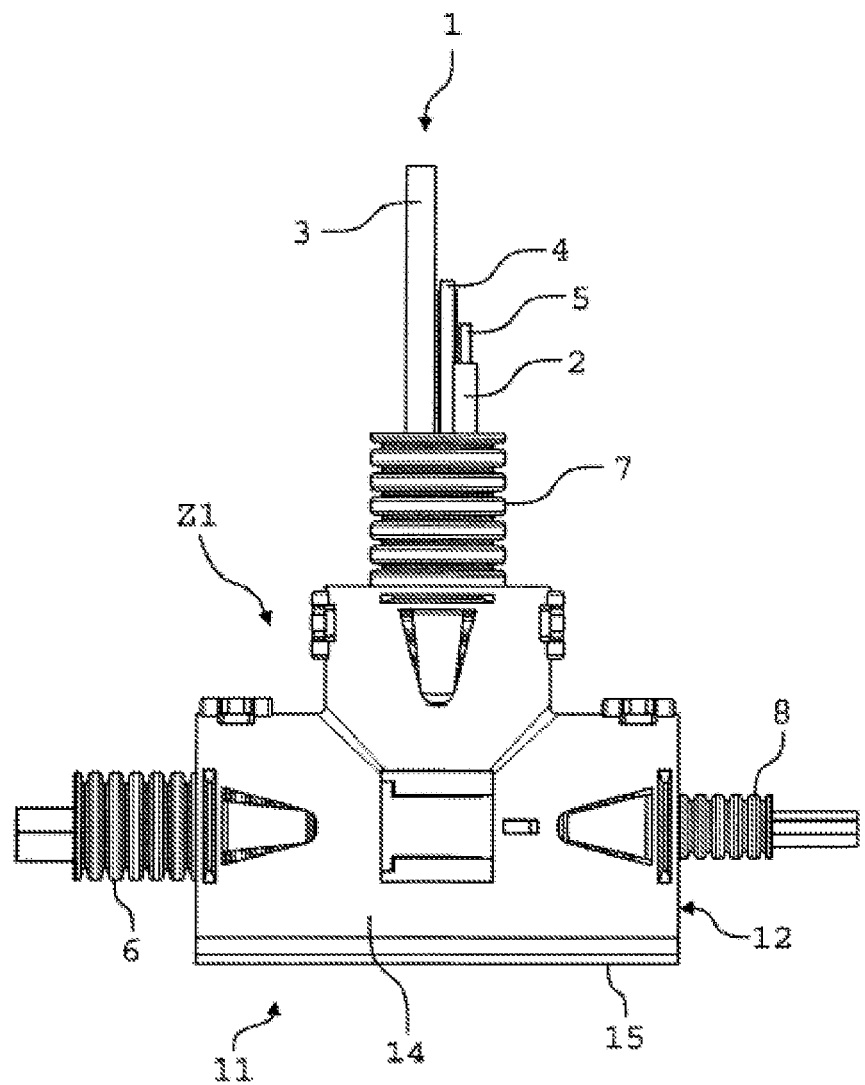
FIG. 1 shows a schematic view of an embodiment of a cable harness.
Figure 2:
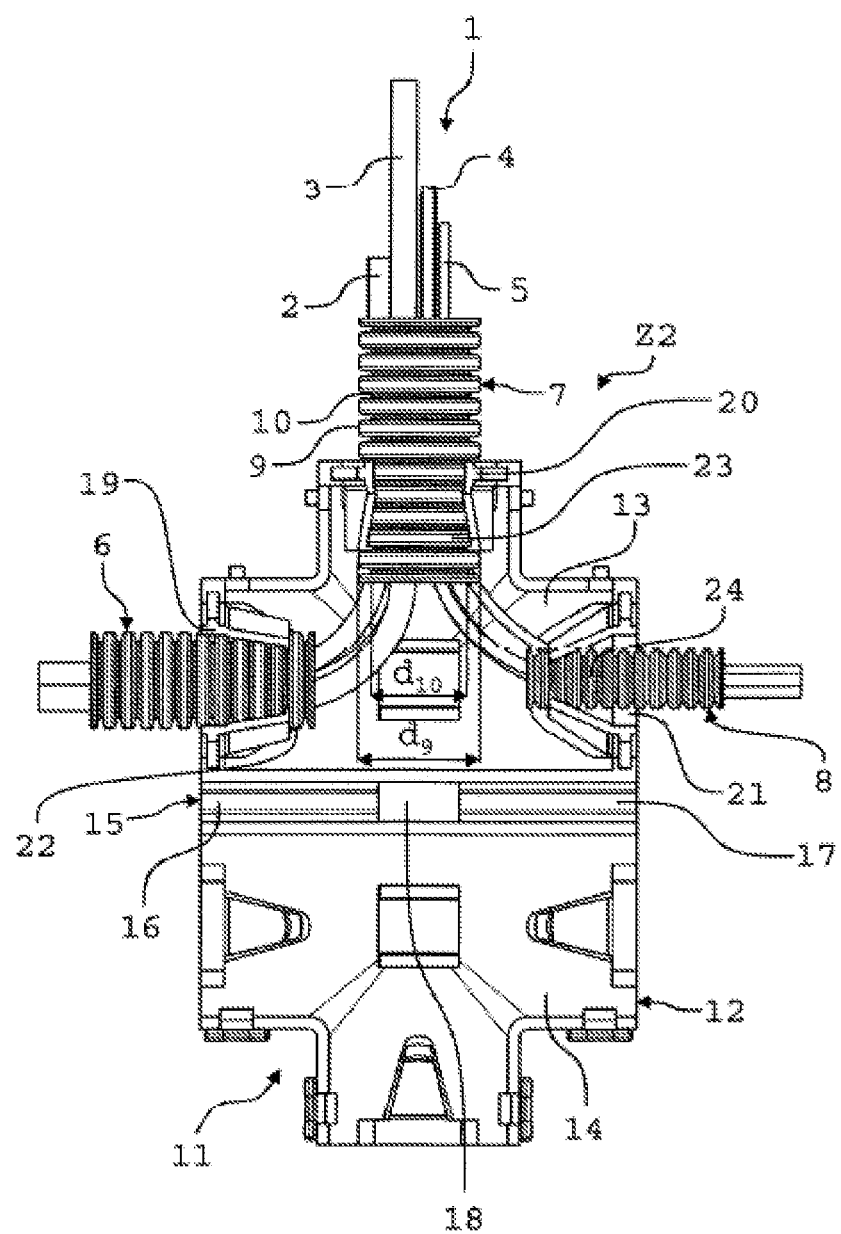
FIG. 2 shows a further schematic view of the cable harness according to FIG. 1.

FIGS. 1 and 2 show in each case a schematic view of an embodiment of a cable harness 1. The cable harness 1 is suitable for mobile applications such as motor vehicles, marine craft, aircraft, and rail vehicles. The cable harness 1 can also be used for non-mobile applications such as apparatuses, buildings, machine tools, process-technology systems, or the like.

The cable harness 1 comprises a multiplicity of lines or cables 2 to 5. The cable harness 1 furthermore comprises a plurality of tubes 6 to 8, in particular a first tube 6, a second tube 7, and a third tube 8 in which the cables 2 to 5 are at least in portions received. The tubes 6 to 8 can be of dissimilar or identical construction. Furthermore, the tubes 6 to 8 can in each case have identical diameters, or dissimilar diameters as shown in FIGS. 1 and 2. The tubes 6 to 8 can be, for example, corrugated tubes, smooth tubes, in particular PVC tubes, or textile tubes or woven-fabric tubes. The tubes 6 to 8 can be made from a plastic material or from a synthetic fabric. The invention will be explained hereunder by means of corrugated tubes. This means that the tubes 6 to 8 are corrugated tubes.

The tubes 6 to 8 can also be corrugated pipes or be referred to as corrugated pipes. A corrugated tube differs from the likewise axially flexible corrugated pipe by way of an elasticity in the radial and the length-elongating direction. Said elasticity is substantially caused by the material but can also be further supported by the shaping of the corrugation. Corrugated tubes are both a protective pipe for the actual utilising media such as cables, tubes, or pipes, as well as actual transporters of liquids and gases. The term "corrugated tube" can thus be replaced by the term "corrugated pipe".

Each tube 6 to 8 comprises a corrugation having wave crests 9 and wave troughs 10. A wave trough 10 herein is disposed between two wave crests 9, or a wave crest 9 is disposed between two wave troughs 10, respectively. For example, the tube 7 at the wave crests 9 has an external diameter $d_9$ and on the wave troughs 10 has an internal diameter $d_{10}$.

The cable harness 1 furthermore comprises at least one receiving device 11 for receiving the tubes 6 to 8. The receiving device 11 can also be referred to as a distributor, a distributing device, a universal distributor, an adapter, adapter device, or a universal adapter. The receiving device 11 is T-shaped and can therefore also be referred to as a T-distributor. The receiving device 11 is preferably made from a plastic material. The receiving device 11 can be made from PA, for example. PA6 or PA66 can in particular be used as a material for the receiving device 11. The receiving device 11 is a plastic injection-molded component.

The receiving device 11 comprises a main body 12 having a first half shell 13 as well as a second half shell 14. The half shells 13, 14 are pivotably interconnected with the aid of a hinge 15. The hinge 15 is preferably an integral hinge. An integral hinge is a thin-walled connection which in a materially integral manner is configured conjointly with two elements to be connected, in this case the half shells 13, 14. Integral hinges are composed substantially of a thin-walled connection which is deformable in a spring-elastic manner. The hinge 15 comprises a first hinge portion 16 as well as a second hinge portion 17 between which a clearance 18 is provided. The deformation capability of the hinge 15 can be set by way of the width of the clearance 18. Alternatively, the first half shell 13, the second half shell 14, and the hinge 15 can also be made from dissimilar materials. For example, the hinge 15 can be made from another, in particular a more flexible, material than the half shells 13, 14, or than one of the half shells 13, 14. To this end, the receiving device 11 can be produced, for example, with the aid of a bi-component injection-molding method.

The receiving device 11 can be transformed from a closed state Z1, shown in FIG. 1, to an opened state Z2, shown in FIG. 2, with the aid of the hinge 15. In the closed state Z1 the half shells 13, 14 lie on top of one another. In the opened state Z2 the half shells 13, 14 do not lie on top of one another and are in particular positioned beside one another.

The main body 12 comprises a plurality of receptacle portions 19 to 21, in particular a first receptacle portion 19, a second receptacle portion 20, and a third receptacle portion 21. The receptacle portions 19 to 21 are tubular having a circular cross section. Each receptacle portion 19 to 21 is assigned one of the tubes 6 to 8, wherein a respective end portion 22 to 24 of the tubes 6 to 8 at least in portions is received in the receptacle portion 19 to 21 that is assigned to said end portion 22 to 24. In the closed state Z1 the respective end portion 22 to 24 of the tubes 6 to 8 is disposed between the two half shells 13, 14. The number of receptacle portions 19 to 21 is arbitrary. Three receptacle portions 19 to 21 of this type can be provided, for example.

Figure 3:
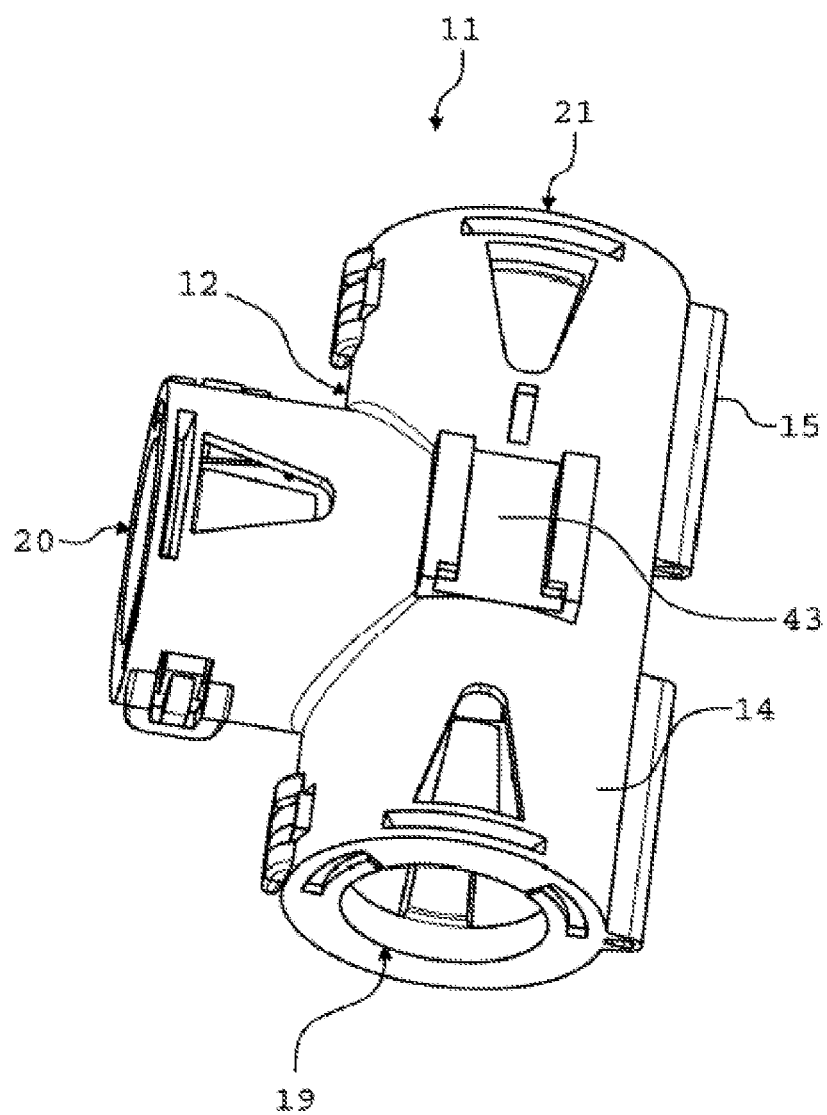
FIG. 3 shows a schematic perspective view of an embodiment of a receiving device for the cable harness according to FIG. 1.
Figure 4:
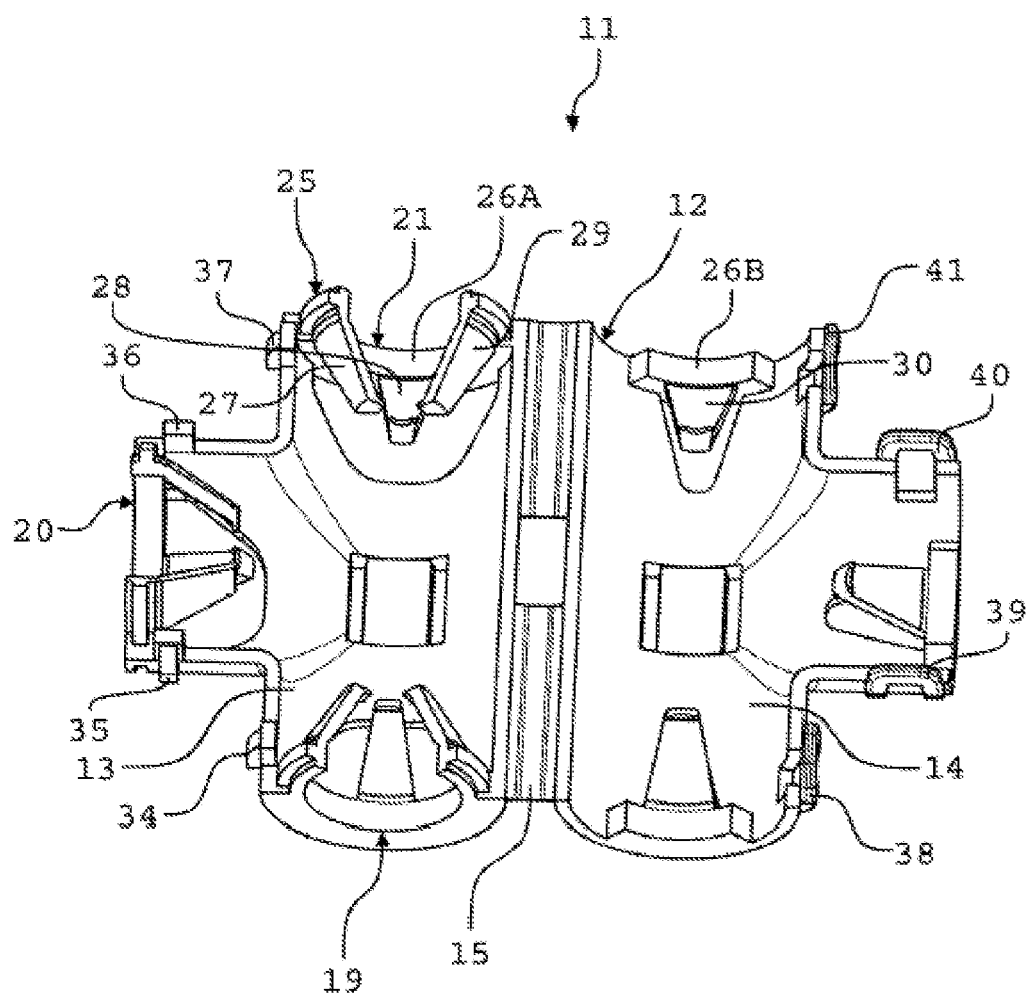
FIG. 4 shows a further schematic perspective view of the receiving device according to FIG. 3.
Figure 5:
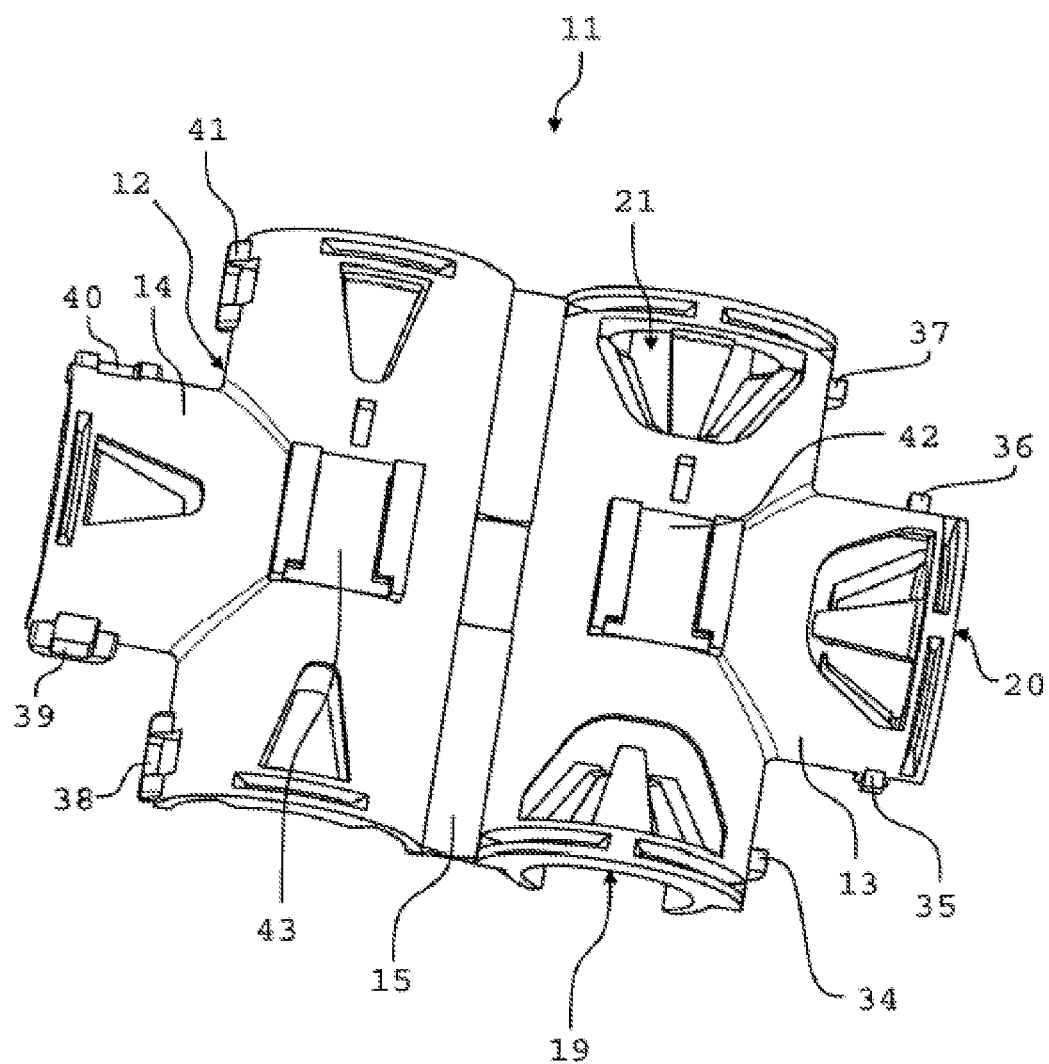
FIG. 5 shows a further schematic perspective view of the receiving device according to FIG. 3.
Figure 6:
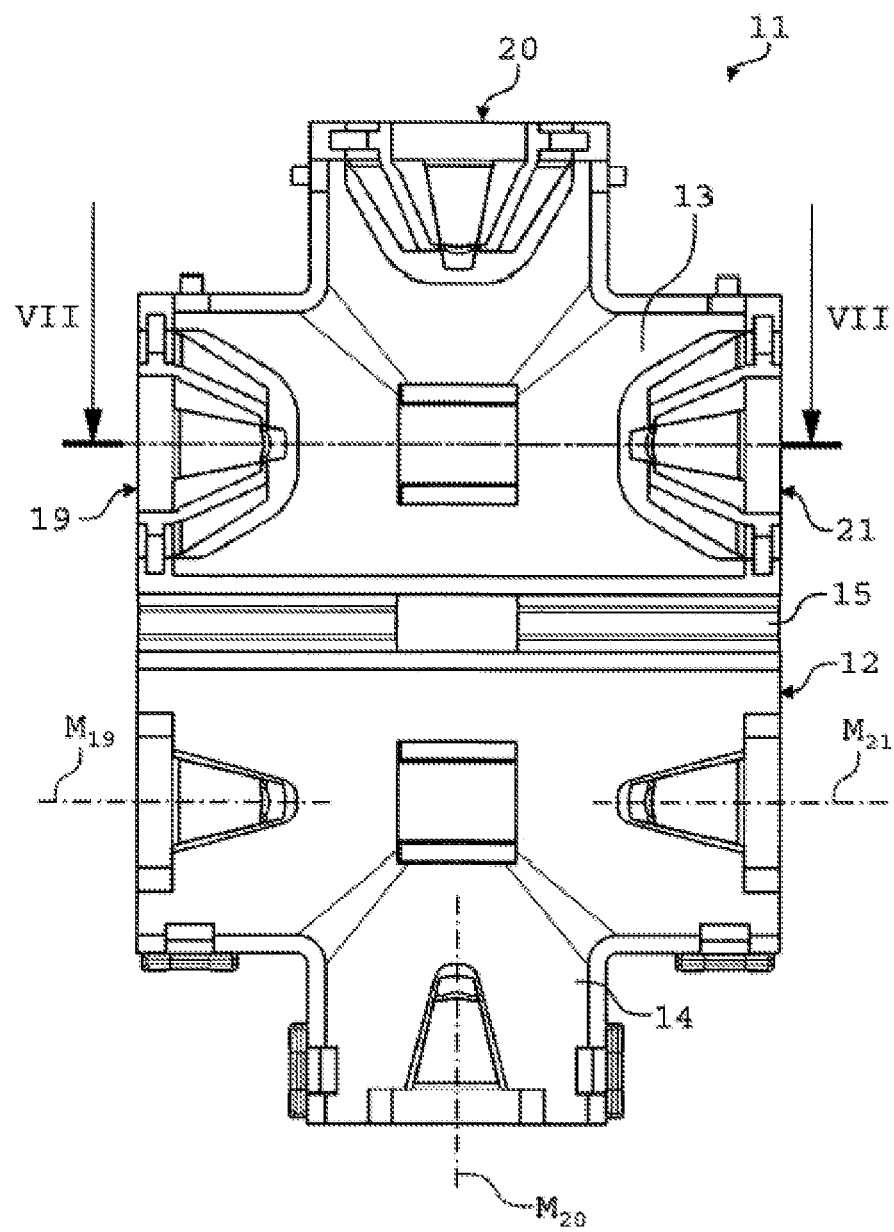
FIG. 6 shows a schematic plan view of the receiving device according to FIG. 3.
Figure 7:
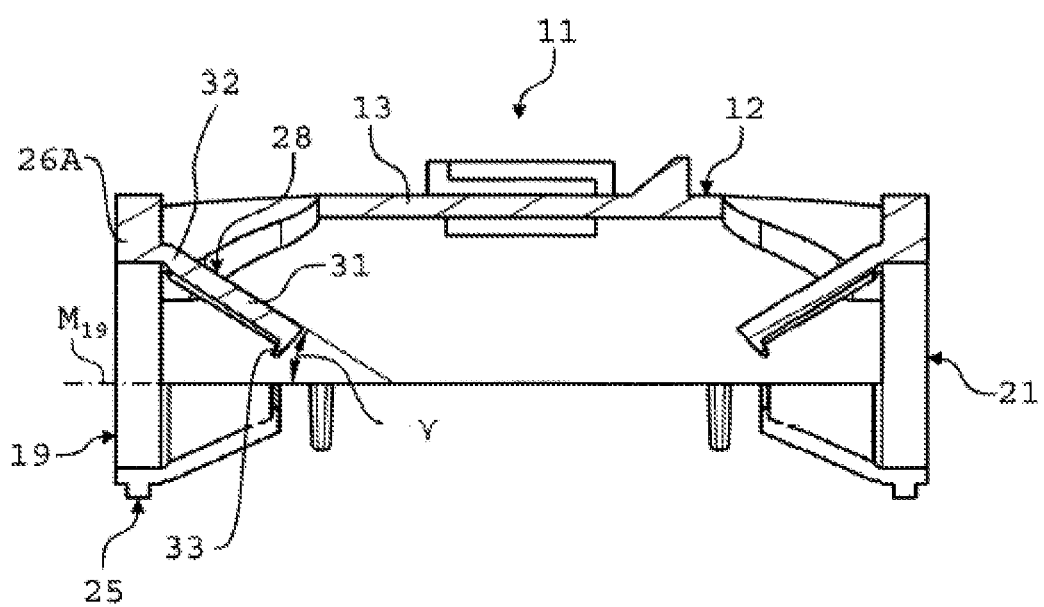
FIG. 7 shows a schematic sectional view of the receiving device according to the section line VII-VII of FIG. 6.
Figure 8:
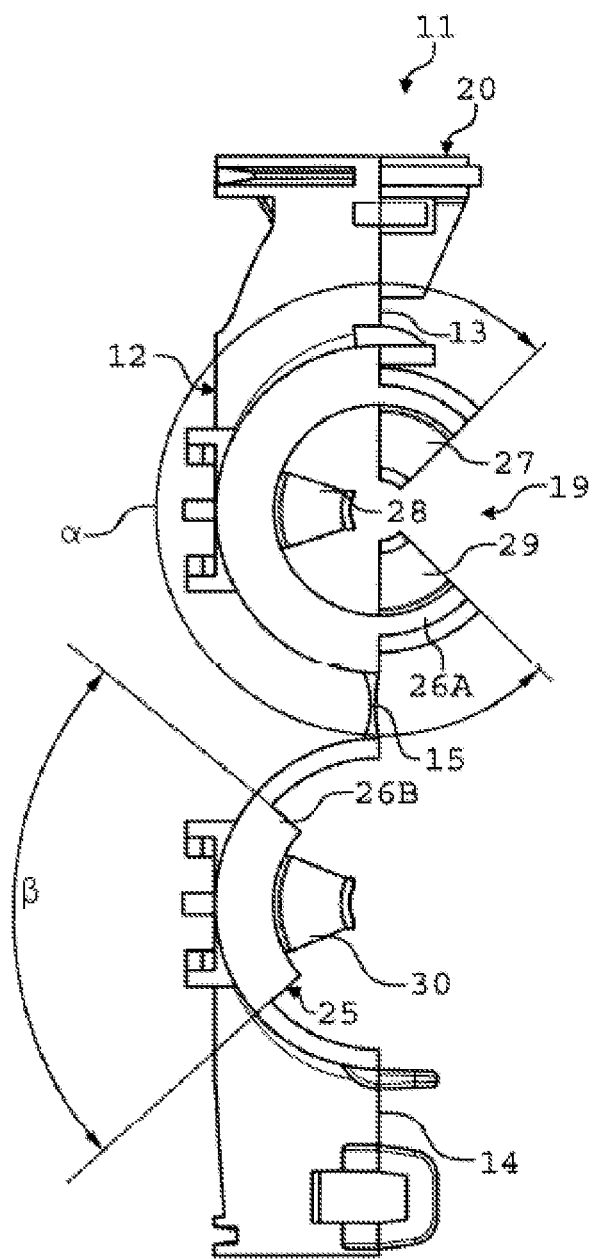
FIG. 8 shows a schematic lateral view of the receiving device according to FIG. 3.
Figure 9:
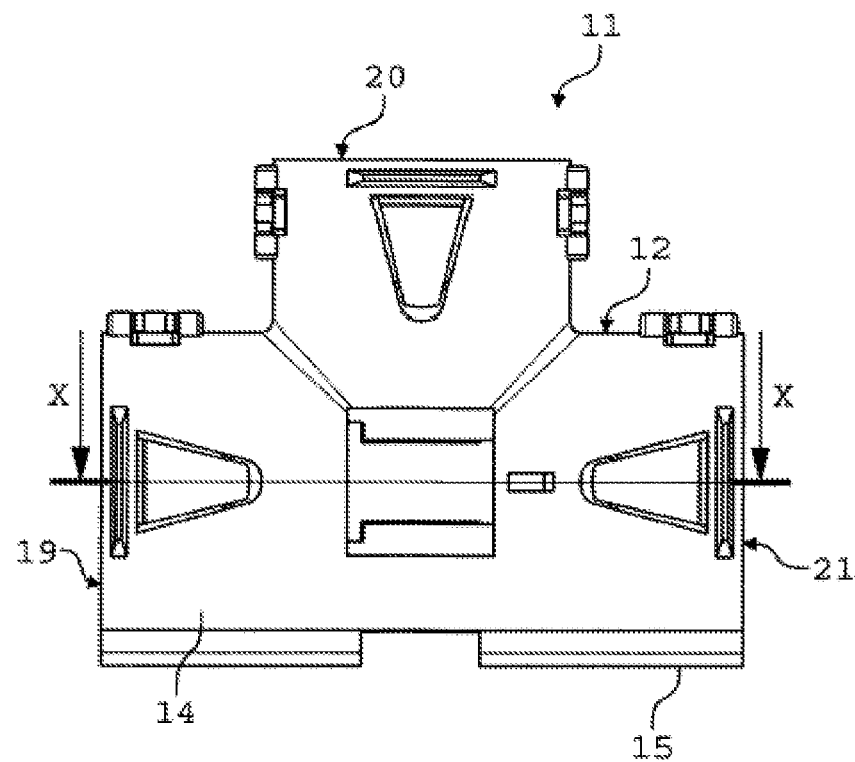
FIG. 9 shows a further schematic plan view of the receiving device according to FIG. 3.
Figure 10:
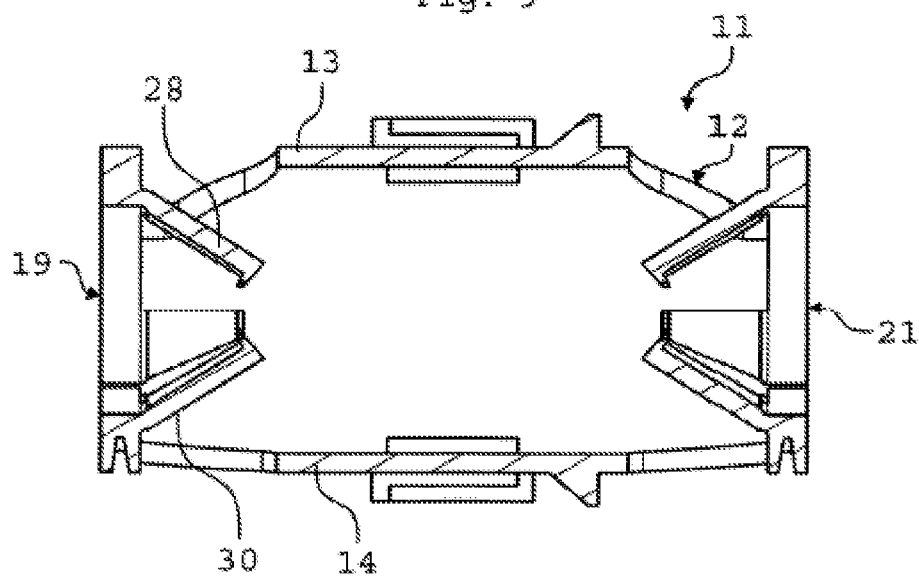
FIG. 10 shows a schematic sectional view of the receiving device according to the section line X-X of FIG. 9.
Figure 11:
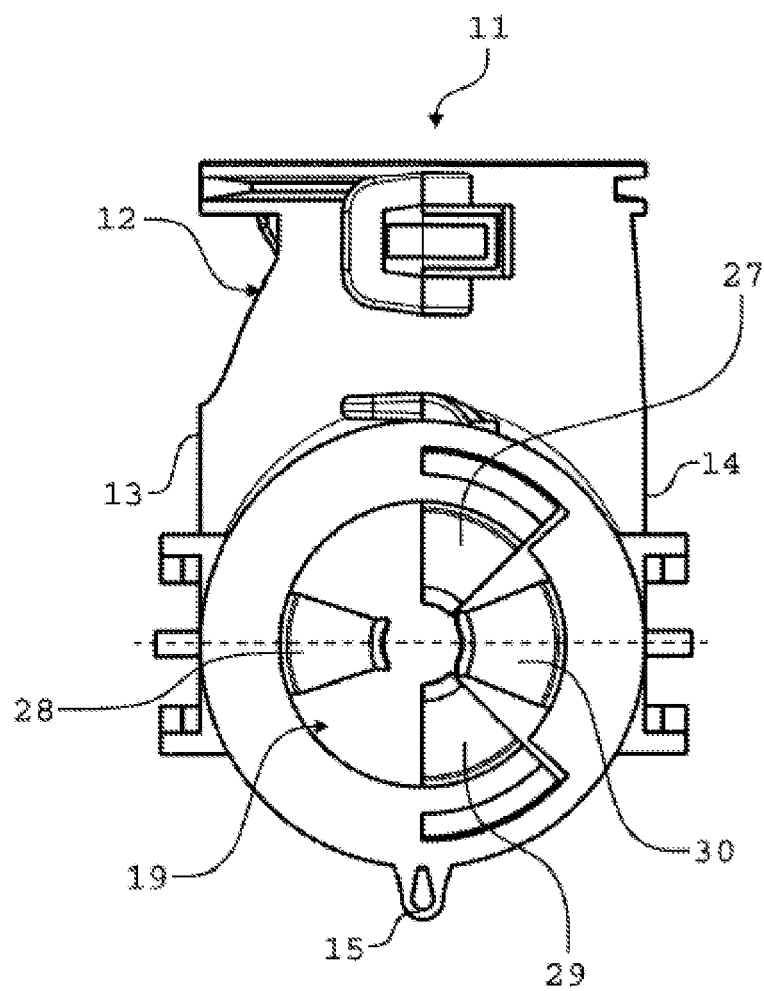
FIG. 11 shows a further schematic lateral view of the receiving device according to FIG. 3.

FIGS. 3 to 5 show in each case dissimilar schematic perspective views of the receiving device 11. FIG. 6 shows a schematic plan view of the receiving device 11 in the opened state Z2. FIG. 7 shows a schematic sectional view of the receiving device 11 according to the section line VII-VII of FIG. 6. FIG. 8 shows a schematic lateral view of the receiving device 11 in the opened state Z2. FIG. 9 shows a schematic plan view of the receiving device 11 in the closed state Z1. FIG. 10 shows a schematic sectional view of the receiving device 11 according to the section line X-X of FIG. 9, and FIG. 11 shows a schematic lateral view of the receiving device 11 in the closed state Z1. Reference hereunder is simultaneously made to FIGS. 3 to 11.

Each receptacle portion 19 to 21 is assigned a symmetry axis or central axis $M_{19}$ to $M_{21}$ (FIG. 6). The receptacle portions 19 to 21 can in each case be configured so as to be rotationally symmetrical to the central axes $M_{19}$ to $M_{21}$ assigned to said receptacle portions 19 to 21. For example, the central axis $M_{19}$ of the first receptacle portion 19 and the central axis $M_{21}$ of the third receptacle portion 21 can be disposed so as to be mutually parallel and in particular mutually coaxial. The central axis $M_{20}$ of the second receptacle portion 20 can be disposed so as to be perpendicular to the central axis $M_{19}$ and to the central axis $M_{21}$. Alternatively, the central axes $M_{19}$ to $M_{21}$, or at least one of the central axes $M_{19}$ to $M_{21}$, can also be positioned relative to one another at a predetermined angle. Perpendicular herein is to be understood as an angle of 90°±10°, furthermore preferably of 90°±5°, furthermore preferably of 90°±1°, furthermore preferably of exactly 90°. The receptacle portions 19 to 21 can be configured so as to be identical, that is to say having identical diameters, or so as to be dissimilar, that is to say having dissimilar diameters.

Each receptacle portion 19 to 21 comprises an annular portion 25 that encircles the respective receptacle portion 19 to 21 (FIG. 4, FIG. 8). The annular portion 25 is subdivided into a first annular segment 26A that is assigned to the first half shell 13, and into a second annular segment 26B that is assigned to the second half shell 14. In the closed state Z1 of the receiving device 11 the first annular segment 26A protrudes into the second half shell 14. To this end, the first annular segment 26A extends from the first half shell 13. For example, the first annular segment 26A has a circumferential angle α of 270°, as is shown in FIG. 8. The second annular segment 26B in a manner corresponding thereto can have a circumferential angle β of 90°. In the closed state Z1 of the receiving device 11 the second annular segment 26B engages in a form-fitting manner in the first annular segment 26A.

Each receptacle portion 19 to 21 is assigned a plurality of engagement portions 27 to 30 which are deformable in a spring-elastic manner (FIG. 4, FIG. 8, FIG. 11). A first engagement portion 27, a second engagement portion 28, a third engagement portion 29, and a fourth engagement portion 30 can be provided. The number of engagement portions 27 to 30 per receptacle portion 19 to 21 is arbitrary. For example, four engagement portions 27 to 30 of this type can be provided, wherein a first part of the engagement portions 27 to 30, for example the engagement portions 27 to 29, is provided on the first half shell 13, and a second part of the engagement portions 27 to 30, for example the fourth engagement portion 30, is provided on the second half shell 14.

At least three engagement portions 27 to 30 are provided per receptacle portion 19 to 21, wherein the first part of the engagement portions 27 to 30 comprises at least two engagement portions 27 to 29, and the second part of the engagement portions 27 to 30 comprises at least one engagement portion 30 of this type. As is shown in FIG. 11, the engagement portions 27 to 30 are disposed so as to be distributed in a non-uniform manner across a respective circumference of the receptacle portions 19 to 21. The engagement portions 27 to 29 are assigned to the first annular segment 26A of the annular portion 25, and the fourth engagement portion 30 is assigned to the second annular segment 26B.

As is shown in FIG. 7 by means of the second engagement portion 28, the latter extends obliquely from the first annular segment 26A of the annular portion 25 toward the central axis $M_{19}$ of the receptacle portion 19. For example, the second engagement portion 28, like the engagement portions 27, 29, 30, in relation to the central axis $M_{19}$ encloses an inclination angle γ of 35°. The inclination angle γ is arbitrary. Each engagement portion 27 to 30 comprises one spring element 31 which is positioned so as to be oblique to the central axis $M_{19}$. The spring element 31 is deformable in a spring-elastic manner. The spring element 31 is wedge-shaped, trapezoidal, or triangular, and tapers toward a tip in the direction of the central axis $M_{19}$. This means that the spring element 31 tapers off in the direction toward the central axis $M_{19}$.

The spring element 31 extends from the respective annular segment 26A, 26B and is connected to the latter in a spring-elastic manner by way of an articulation point 32. The articulation point 32 can be a thin spot similar to an integral hinge. The articulation point 32 can be optional, that is to say that the spring element 31 can also be connected directly, without a cross-sectional constriction, to the respective annular segment 26A, 26B. A hook element 33 which is specified for engaging in a form-fitting manner in a wave trough 10 of the tube 6 to 8 that is assigned to the respective receptacle portion 19 to 21 is provided on the end side on the spring element 31. A form-fitting connection is created by the mutual engagement of at least two connecting partners, or the engagement of the latter behind one another, the connecting partners in this case being the wave trough 10 and the engagement portions 27 to 20. The spring element 31 conjointly with the hook element 33 forms a snap-fit hook that is deformable in a spring-elastic manner. This means that the engagement portions 27 to 30 are snap-fit hooks or can be referred to as snap-fit hooks. The spring element 31 and the hook element 33 are interconnected in a materially integral manner.

The engagement portions 27 to 29 in the opened state Z2 of the receiving device 11 are specified for holding in a self-reliant manner the respective end portion 22 to 24 of the tube 6 to 8. This means that the respective end portion 22 to 24 in the opened state Z2 of the receiving device 11 is fixed in the receptacle portion 19 to 21 that is assigned to said end portion 22 to 24, even without transforming the receiving device 11 from the opened state Z2 to the closed state Z1. On account thereof, a preliminary fixing of the tubes 6 to 8 can be achieved in the assembly of the receiving device 11. To this end the engagement portions 27 to 29 are disposed such that the latter circumferentially encompass the respective end portion 22 to 24 of the corrugated face 6 to 8, as can be seen in FIG. 11. To this end, the first and the third engagement portion 27, 29 in the closed state Z1 of the receiving device 11 are completely disposed within the second half shell 14.

The receiving device 11 furthermore comprises a multiplicity of snap-fit hooks 34 to 37 (FIG. 4, FIG. 5) which are provided on the first half shell 13 and which are specified for snap-fitting into receptacle portions 38 to 41 that are provided on the second half shell 14. When transforming the receiving device 11 from the opened state Z2 to the closed state Z1, the snap-fit hooks 34 to 37 snap-fit into the receptacle portions 38 to 41 that are assigned to said snap-fit hooks 34 to 37, wherein the snap-fit hooks 34 to 37 and/or the receptacle portions 38 to 41 are deformed in a spring-elastic manner. On account thereof, the receiving device 11 is locked in the closed state Z1. The receiving device 11 furthermore comprises fastening elements 42, 43 which are provided on the first half shell 13 and/or on the second half shell 14 and with the aid of which the receiving device 11 is capable of being assembled in a junction box or the like.

The functional mode of the receiving device 11 will be explained hereunder. As is shown in FIG. 2, in the opened state Z2 of the receiving device 11, for the assembly of the cable harness 1 the tubes 6 to 8 by way of their respective end portions 22 to 24 thereof are push-fitted into the receptacle portions 19 to 21 that are assigned to the respective tube 6 to 8. The assembly direction herein is oriented so as to be perpendicular to the central axes $M_{19}$ to $M_{21}$. The cables 2 to 5 herein can already be received in the tubes 6 to 8 and be distributed among the latter.

When the end portions 22 to 24 of the tubes 6 to 8 are push-fitted into the respective receptacle portions 19 to 21, the engagement portions 27 to 29 which are assigned to the first half shell 13 are deformed in a spring-elastic manner and collectively engage in a form-fitting manner in a wave trough 10 of the respective tube 6 to 8. Depending on the size of the internal diameter $d_{10}$ of the respective tube 6 to 8, the engagement portions 27 to 28 are more heavily or less heavily deformed. In the deformation of the engagement portions 27 to 28, the latter are deformed in a radially outward manner in the direction of the annular portion 25. On account of the engagement portions 27 to 29 already encompassing in a form-fitting manner the respective end portions 22 to 24 in the opened state Z2, the tubes 6 to 8 are fixed in a preliminary manner to the first half shell 13 and can no longer fall out of said half shell 13.

The receiving device 11 is subsequently transformed from the opened state Z2, shown in FIG. 2, to the closed state Z1, shown in FIG. 2, wherein the snap-fit hooks 34 to 37 latch or snap-fit into the receptacle portions 38 to 41 that are assigned to said snap-fit hooks 34 to 37 when the receiving device 11 is being closed. Furthermore, the fourth engagement portion 30 which is provided on the second half shell 14 in the transformation of the receiving device 11 from the opened state Z2 to the closed state Z1 likewise engages in a form-fitting manner in the wave trough 10 in which the engagement portions 27 to 29 already engage, said fourth engagement portion 30 herein being deformed in a spring-elastic manner. A locking of the tubes 6 to 8 after the preliminary fixing thereof can thus be performed with the aid of the fourth engagement portion 30. An extraction of the tubes 6 to 8 from the receiving device 11 in the closed state Z1 is no longer possible without destroying the receiving device 11 and/or the tubes 6 to 8.

The receiving device 11 is suitable for mobile applications such as motor vehicles, marine craft, aircraft, and rail vehicles. The receiving device 11 can also be used for non-mobile applications such as apparatuses, buildings, machine tools, process-technological systems, or the like.

On account of the engagement portions 27 to 30 being deformable in a spring-elastic manner, a very large diameter range of the tubes 6 to 8 can be covered with the aid of the receiving device 11. This means that a dedicated receiving device 11 is not required for each tube diameter. On account thereof, the number of injection-molding tools required for producing the receiving device 11 can be reduced, for example. Furthermore, the warehousing costs for the receiving device 11 can also be reduced, since no dedicated receiving device 11 has to be kept on hand for each tube diameter or for each combination of tube diameters. This results in an enormous saving in costs as compared to known receiving devices.

Figure 12:
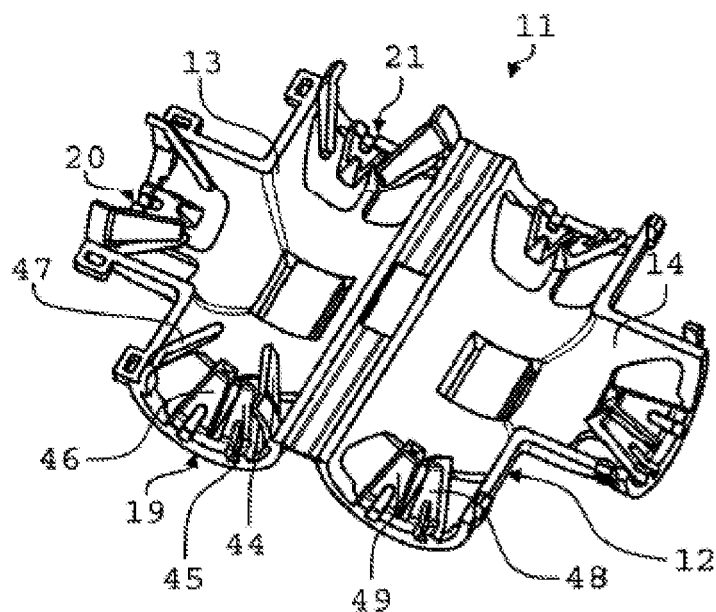
FIG. 12 shows a schematic perspective view of a further embodiment of the receiving device for the cable harness according to FIG. 1.
Figure 13:
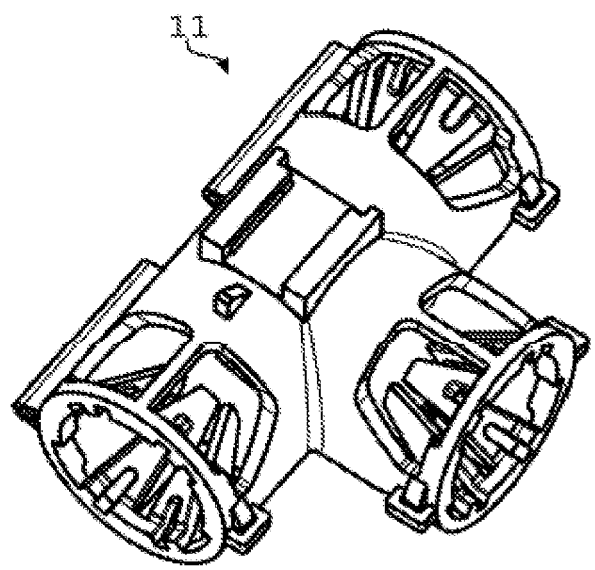
FIG. 13 shows a further schematic perspective view of the receiving device according to FIG. 12.

FIGS. 12 and 13 show in each case in a schematic perspective view a further embodiment of a receiving device 11. The receiving device 11 according to FIGS. 12 and 13 differs from the receiving device according to FIGS. 1 to 11 in that six engagement portions 44 to 49 instead of four engagement portions 27 to 30 are provided, wherein for engagement portions 44 to 47 are assigned to the first half shell 13, and two engagement portions 48, 49 are assigned to the second half shell 14. The engagement portions 44 to 49 otherwise are constructed in a manner identical to the engagement portions 27 to 30. The embodiment of the receiving device 11 according to FIGS. 12 and 13 is particularly suitable for tubes 6 to 8 having large diameters. The receiving device 11 is in particular configured as a T-distributor.

Figure 14:
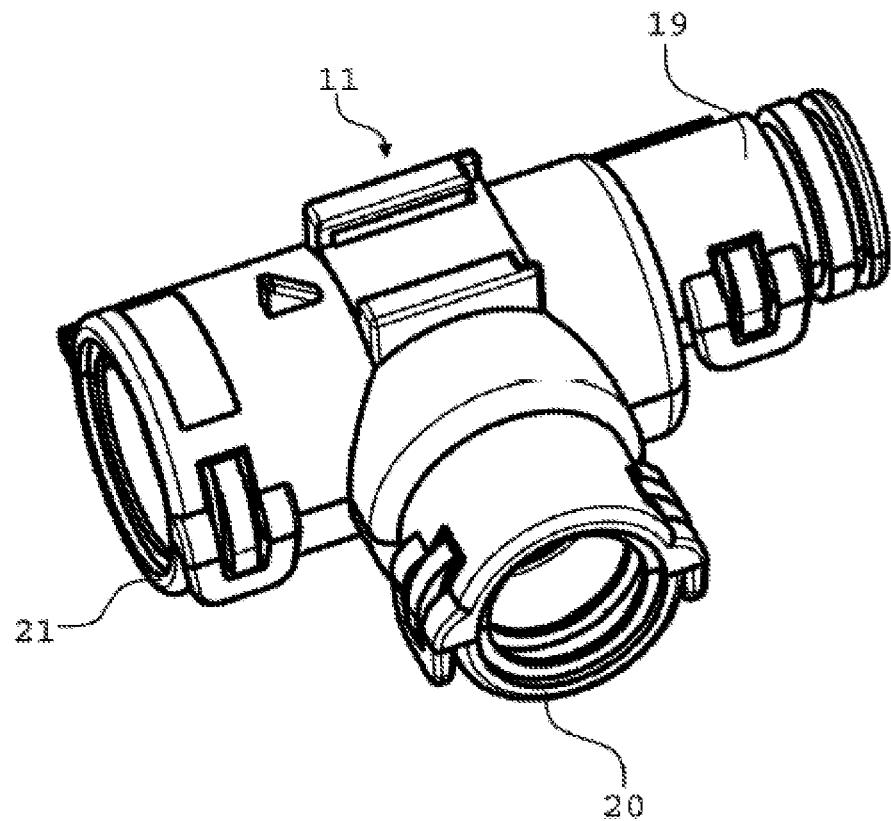
FIG. 14 shows a schematic perspective view of a further embodiment of a receiving device for the cable harness according to FIG. 1.

FIG. 14 shows a schematic perspective view of a further embodiment of a receiving device 11. The receiving device 11 according to FIG. 14 differs from the receiving device 11 according to FIGS. 1 to 11 in that the receptacle portions 19 to 21 have dissimilar diameters. The receiving device 11 is in particular configured as a T-distributor. The engagement portions 27 to 30 of the receptacle portions 19 to 21 are not illustrated in FIG. 14.

Figure 15:
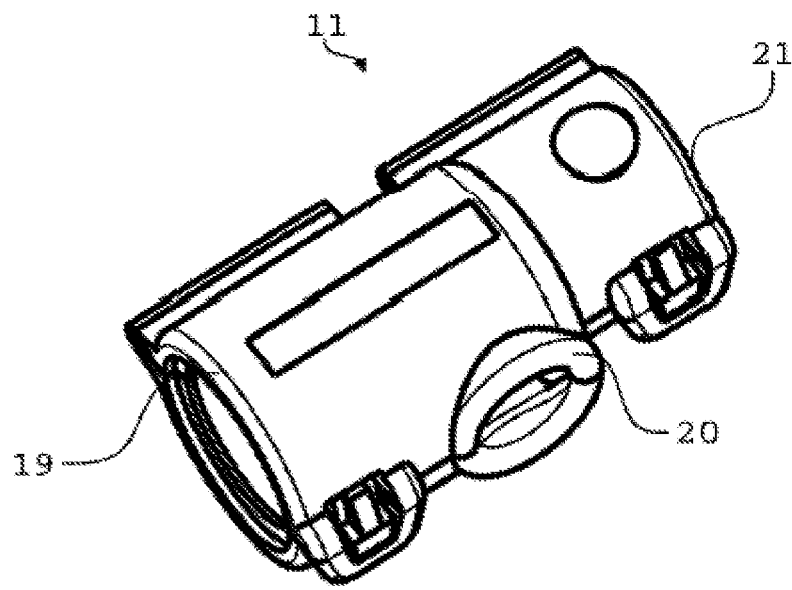
FIG. 15 shows a schematic perspective view of a further embodiment of a receiving device for the cable harness according to FIG. 1.
Figure 16:
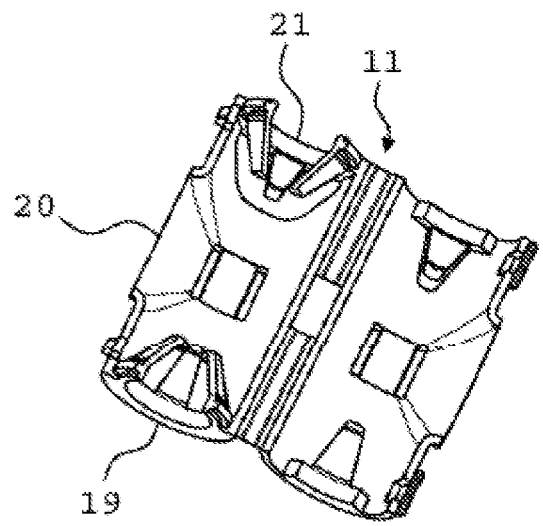
FIG. 16 shows a further schematic perspective view of the receiving device according to FIG. 15.

FIGS. 15 and 16 show in each case in a schematic perspective view a further embodiment of a receiving device 11. The receiving device 11 according to FIGS. 15 and 16 differs from the receiving device 11 according to FIGS. 1 to 11 in that the first receptacle portion 19 and the third receptacle portion 21 have dissimilar diameters, and in that the second receptacle portion 20 is configured only as a bore, without engagement portions 27 to 30, which is provided in the half shells 13, 14. The receiving device 11 according to FIGS. 15 and 16 can also be referred to as an A-distributor.

Figure 17:
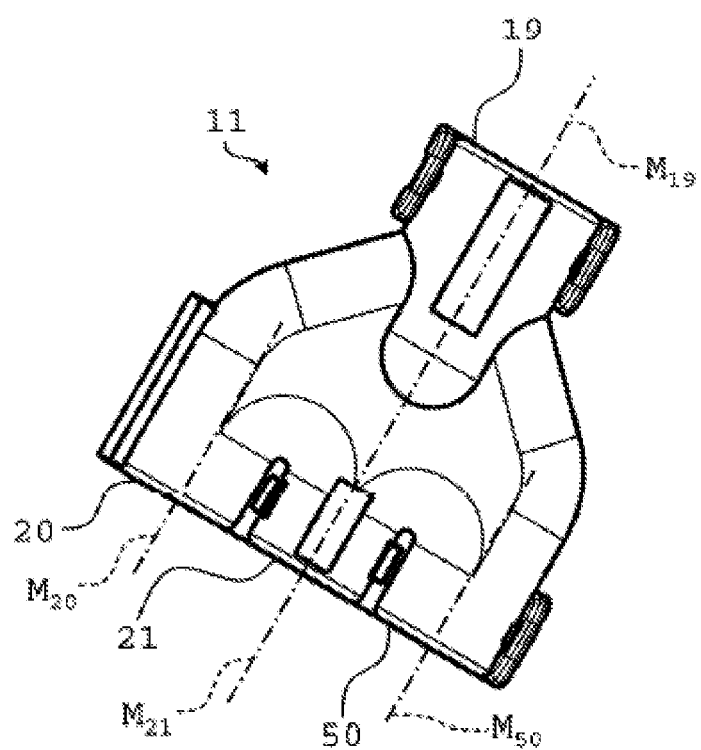
FIG. 17 shows a schematic perspective view of a further embodiment of a receiving device for the cable hardness according to this FIG. 1.

FIG. 17 shows a further schematic perspective view of an embodiment of a receiving device 11. The receiving device 11 according to FIG. 17 differs from the receiving device 11 according to FIGS. 1 to 11 in that four receptacle portions 19 to 21, 50 are provided instead of three receptacle portions 19 to 21, the central axes $M_{19}$, $M_{20}$, $M_{21}$, and $M_{50}$ of said receptacle portions 19 to 21, 50 being disposed so as to be mutually parallel, wherein the central axis $M_{21}$ is configured so as to be coaxial with the central axis $M_{19}$, and the central axes $M_{20}$, $M_{50}$ are configured so as not to be coaxial with the central axis $M_{19}$. The receiving device 11 according to FIG. 17 can also be referred to as an M-distributor. The engagement portions 27 to 30 of the receptacle portions 19 to 21, 50 are not illustrated in FIG. 17.

Figure 18:
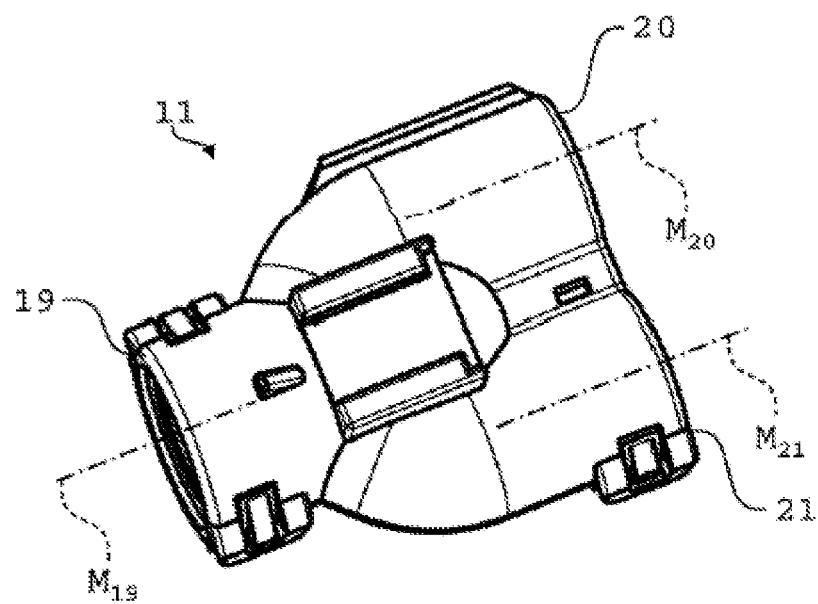
FIG. 18 shows a schematic perspective view of a further embodiment of a receiving device for the cable harness according to FIG. 1.
Figure 19:
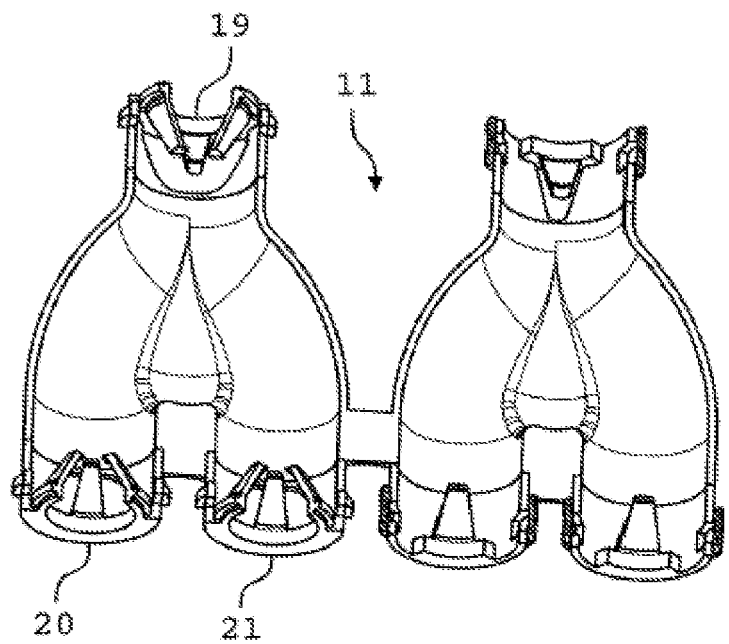
FIG. 19 shows a further schematic perspective view of the receiving device according to FIG. 18.

FIGS. 18 and 19 show in each case in a schematic perspective view a further embodiment of a receiving device 11. The receiving device 11 according to FIGS. 18 and 19 differs from the receiving device 11 according to FIGS. 1 to 11 in that the receptacle portions 19 to 21 have dissimilar diameters, wherein the receptacle portions 20, 21 have an identical diameter, and in that the central axes $M_{19}$, $M_{20}$, $M_{21}$ are disposed so as to be mutually parallel but not mutually coaxial. The receiving device 11 according to FIGS. 18 and 19 can also be referred to as a V-distributor.

Figure 20:
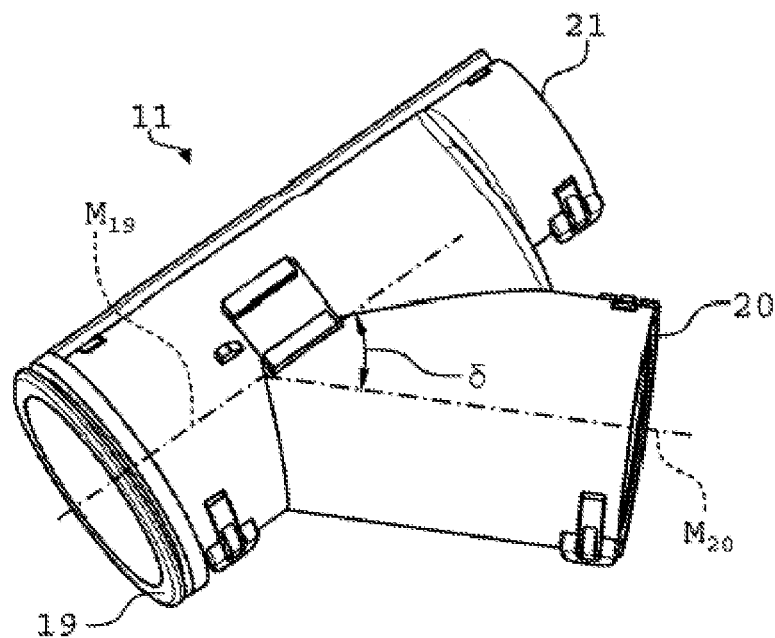
FIG. 20 shows a schematic perspective view of a further embodiment of a receiving device for the cable harness according to FIG. 1.
Figure 21:
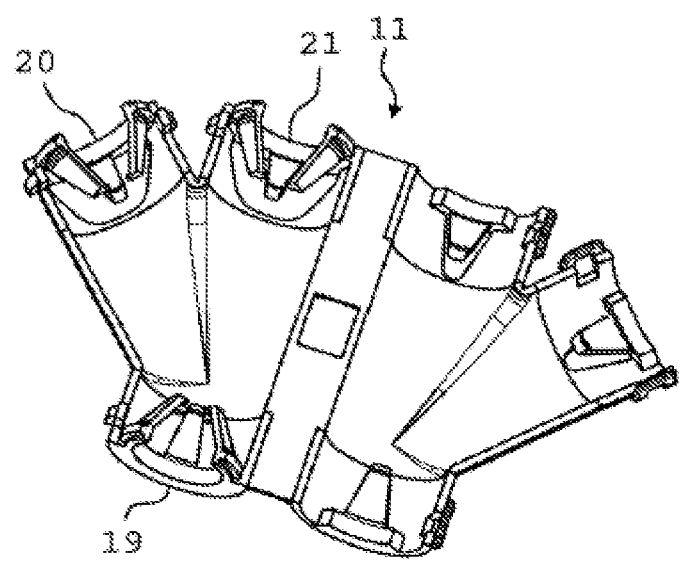
FIG. 21 shows a further schematic perspective view of the receiving device according to FIG. 20.

FIGS. 20 and 21 show in each case in a schematic perspective view a further embodiment of a receiving device 11. The receiving device 11 according to FIGS. 20 and 21 differs from the receiving device 11 according to FIGS. 1 to 11 in that the receptacle portions 19 to 21 have dissimilar diameters, and in that the central axis $M_{29}$ of the second receptacle portion 20 is disposed so as to be oblique to the central axis $M_{19}$ of the first receptacle portion 19. An angle δ can be provided between the central axes $M_{19}$, $M_{29}$, for example. The angle δ can be 45°, for example. The receiving device 11 according to FIGS. 20 and 21 can also be referred to as a Y-distributor.

Figure 22:
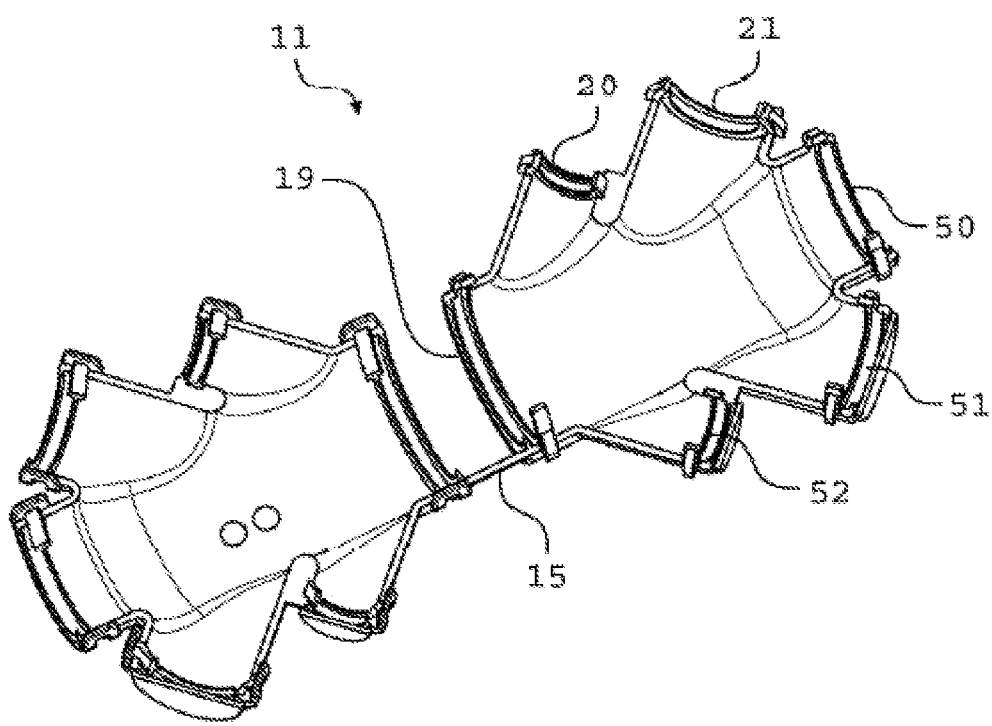
FIG. 22 shows a schematic perspective view of a further embodiment of a receiving device for the cable harness according to FIG. 1.

FIG. 22 shows a further schematic perspective view of an embodiment of a receiving device 11. The receiving device 11 according to FIG. 22 differs from the receiving device 11 according to FIGS. 1 to 11 in that not only three receptacle portions 19 to 21 but six receptacle portions 19 to 21 and 50 to 52 are provided, said receptacle portions being disposed in the manner of a fir tree. The receiving device 11 according to FIG. 22 can also be referred to as a multiple distributor. The engagement portions 27 to 30 of the receptacle portions 19 to 21 and 50 to 52 are not illustrated in FIG. 22.

While the present invention has been described by means of exemplary embodiments, said invention can be modified in various ways.

REFERENCE CHARACTERS LIST

1 Cable harness
2 Cable

3 Cable
4 Cable
5 Cable
6 Tube
7 Tube
8 Tube
9 Wave crest
10 Wave trough
11 Receiving device
12 Main body
13 Half shell
14 Half shell
15 Hinge
16 Hinge portion
17 Hinge portion
18 Clearance
19 Receptacle portion
20 Receptacle portion
21 Receptacle portion
22 End portion
23 End portion
24 End portion
25 Annular portion
26A Annular segment
26B Annular segment
27 Engagement portion
28 Engagement portion
29 Engagement portion
30 Engagement portion
31 Spring element
32 Articulation point
33 Hook element
34 Snap-fit hook
35 Snap-fit hook
36 Snap-fit hook
37 Snap-fit hook
38 Receptacle portion
39 Receptacle portion
40 Receptacle portion
41 Receptacle portion
42 Fastening element
43 Fastening element
44 Engagement portion
45 Engagement portion
46 Engagement portion
47 Engagement portion
48 Engagement portion
49 Engagement portion
50 Receptacle portion
51 Receptacle portion
52 Receptacle portion
$d_9$ External diameter
$d_{10}$ Internal diameter
$M_{19}$ Central axis
$M_{20}$ Central axis
$M_{21}$ Central axis
$M_{50}$ Central axis
Z1 State
Z2 State
α Circumferential angle
β Circumferential angle
Y Inclination angle
δ Angle

The invention claimed is:

1. A receiving device, in particular a distributor, for receiving a tube for electric cables, having:
a main body having at least one receptacle portion, in which an end portion of the tube at least in portions is receivable, wherein the main body has a first half shell and a second half shell between which the end portion of the tube is disposable;
a plurality of engagement portions which are deformable in a spring-elastic manner and which protrude radially into the at least one receptacle portion and which are specified for engaging in a form-fitting manner in the tube, wherein a first part of the engagement portions is provided on the first half shell, and a second part of the engagement portions is provided on the second half shell; and
an annular portion which encircles the at least one receptacle portion and on which the engagement portions are provided, wherein the annular portion is subdivided into a first annular segment that is assigned to the first half shell and into a second annular segment that is assigned to the second half shell, and wherein the first annular segment in a closed state of the receiving device protrudes into the second half shell,
wherein each engagement portion has a spring element which is disposed so as to be oblique to a central axis of the at least one receptacle portion.

2. The receiving device as claimed in claim 1, wherein the tube is a corrugated tube, and wherein the engagement portions are specified for engaging in a form-fitting manner into a wave trough of the tube.

3. The receiving device as claimed in claim 1, wherein at least three engagement portions are provided, and/or wherein the first part of the engagement portions comprises at least two engagement portions and the second part of the engagement portions comprises at least one engagement portion.

4. The receiving device as claimed in claim 1, wherein the engagement portions are disposed so as to be distributed in a non-uniform or uniform manner across a circumference of the at least one receptacle portion.

5. The receiving device as claimed in claim 1, wherein each engagement portion has a single hook element which is provided on the spring element and which is specified for engaging in a form-fitting manner in the tube.

6. The receiving device as claimed in claim 1, wherein the first part of the engagement portions that in an opened state of the receiving device is provided on the first half shell is specified for holding in a self-reliant manner the end portion of the tube such that the end portion in the opened state of the receiving device is fixed to the at least one receptacle portion.

7. The receiving device as claimed in claim 1, wherein the annular portion completely encircles the at least one receptacle portion.

8. The receiving device as claimed in claim 1, wherein the annular segments have dissimilar circumferential angles.

9. The receiving device as claimed in claim 1, wherein the second annular segment in the closed state of the receiving device engages in the first annular segment.

10. The receiving device as claimed in claim 1, wherein the first part of the engagement portions is provided on the first annular segment, and the second part of the engagement portions is provided on the second annular segment.

11. The receiving device as claimed in claim 1, furthermore comprising a plurality of receptacle portions, wherein each receptacle portion is assigned a plurality of engagement portions which are deformable in a spring-elastic manner and which protrude radially into the respective receptacle portion and which are specified for engaging in a form-fitting manner in a tube that is assigned to the respective receptacle portion.

12. The receiving device as claimed in claim 11, wherein central axes of the receptacle portions are positioned so as to be mutually parallel, mutually perpendicular, or at a predetermined mutual angle.

13. The receiving device as claimed in claim 1, wherein the first half shell and the second half shell are pivotably interconnected with the aid of a hinge, in particular of an integral hinge.

14. A cable harness having a tube and a receiving device as claimed in claim 1.

* * * * *